Jan. 10, 1928.
J. HARRIS
ELECTRICITY METER
Filed Jan. 22, 1926
1,655,604
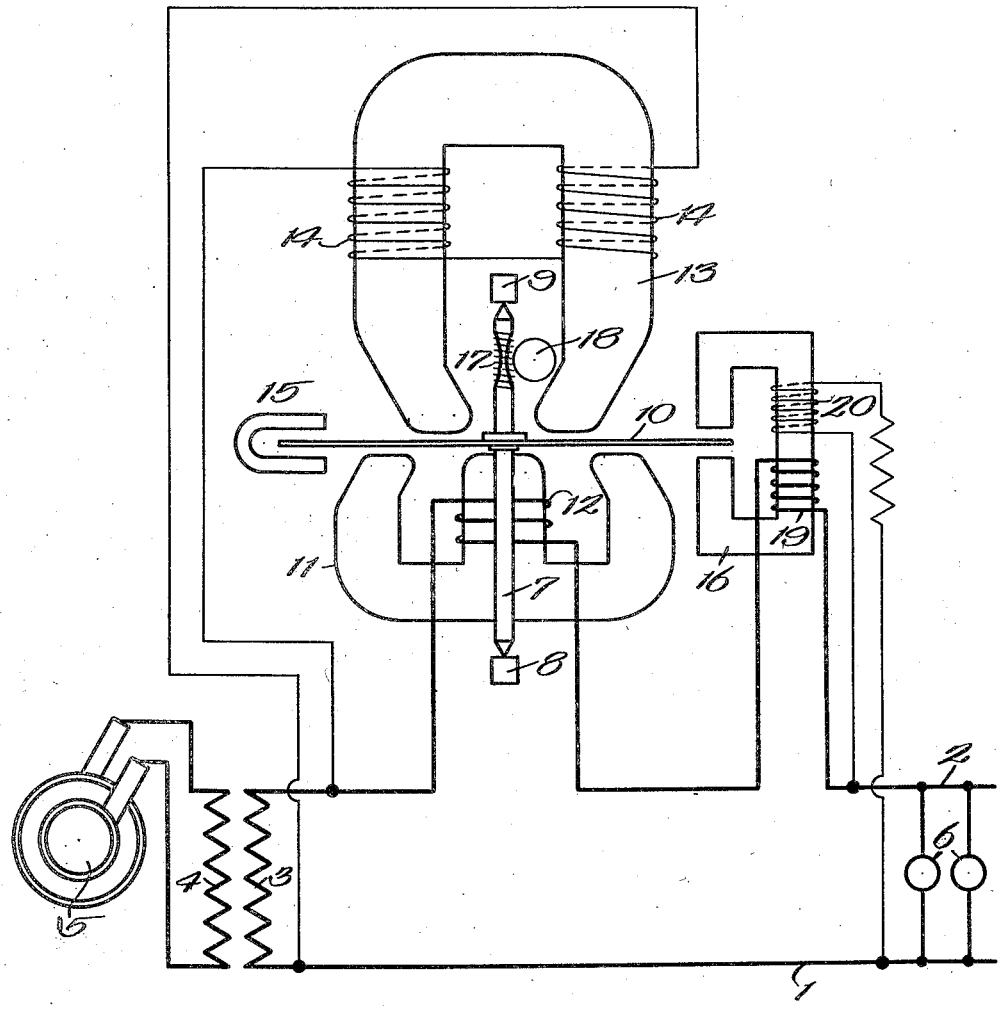
INVENTOR
Jesse Harris
BY
ATTORNEY Patented Jan. 10, 1928.

1,655,604

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY METER.

Application filed January 22, 1926. Serial No. 83,035.

My invention relates to electricity meters employed for measuring electrical energy transmitted by consumption circuits. My invention has for its object the provision of means for causing such a meter to operate accurately over a wide load range.

The load curves of such meters, as hitherto constructed, drop away rapidly as the load is increased beyond a certain point, as, for example, when the meters are measuring so called overloads, a fault which is due to the retarding effect of the flux set up in the meters by the series or load current. I overcome this defect by means of a governor which serves to maintain the rate of rotation of the rotating element of the meter substantially proportional to the energy consumed throughout the load range.

In the preferred embodiment of the invention, this governor resides in a damping magnet in inductive relation to the damping disc upon the meter spindle, this damping magnet being supplied with means for reducing the damping flux furnished thereby as the load current supplied to the system increases. In the preferred embodiment of the invention, there is also a permanent magnet whose damping flux is constant, the two magnets being effective to cause the meter to operate correctly before overloading is reached, the governing or compensating damping magnet also functioning during the overload, for the purpose stated. The governing or compensating damping magnet desirably includes a soft iron magnetizable core having opposed poles between which the periphery of the damping disc turns. This core is wound with a coil that is serially included in one of the mains of the transmission system or is otherwise subject to the current flowing in the sides of the transmission circuit. This core is also wound with another coil which is in bridge of the transmission mains or is otherwise subject to the pressure of the system. The pressure winding of the governing damping magnet serves to establish a damping flux which is substantially constant until the meter is subject to overload, this flux cooperating with the flux of the permanent damping magnet to cause the meter to operate substantially as hitherto, the winding of the governing damping magnet that is subject to the current of the system effecting but little change in the flux of this governing damping magnet until the meter is overloaded. The two windings of the governing damping magnet are opposed so that the magneto motive force due to the current winding of the magnet will increasingly oppose the magneto motive force due to the pressure winding of this magnet. The two windings are so proportioned that at full load the magneto motive force due to the pressure winding less the magneto motive force due to the current winding is sufficient to produce a flux to bring the magnetic condition of core 16 to the knee of its magnetization curve, and as the load increases to correspondingly reduce the effective damping flux of this magnet to cause the meter to rotate substantially in proportion to the energy transmitted in the system.

The accompanying drawing diagrammatically illustrates a single phase alternating current system employing a meter constructed in accordance with the preferred embodiment of the invention.

I have illustrated transmission mains 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6 bridged between the mains. The energy consumed by the load is measured by a watt meter, herein shown of the induction watt hour or integrating type. This meter has a rotating motor element inclusive of an upright spindle or shaft 7 suitably held in bearings 8 and 9. A horizontal aluminum armature disc 10 is carried by the spindle on which the disc is rigidly secured, this disc also constituting the damping disc in alternating current meters. This disc is rotated proportionately to the energy consumed by the load by a motor magnet system that is inclusive of a current or series magnet and a pressure or shunt magnet. The rotating motor of the meter includes a current magnet that has an E shaped core of laminated soft iron 11 whose middle leg is wound by a coil 12 serially included in the main 2. The pressure magnet of the motor is inclusive of a U shaped laminated soft iron core 13 whose legs are surrounded by the coils 14 which are connected in series in the same bridge between the distributing mains 1 and 2. The speed of rotation of the armature of the meter is checked by the main damping permanent magnet 15 and the supplemental damping electro magnet 16 which embrace the peripheral portion of the disc.

The meter parts illustrated and described constitute a rotating motor meter whose armature 10 and spindle 7 turn proportionately to the wattage, the main permanent damping magnet 15 and the governing or supplemental damping magnet 16 cooperating, as will be described. A worm 17 is provided upon the spindle 7 and is in mesh with a pinion 18 that is in driving relation with the counting train of the meter, as is well understood without the necessity of further illustration.

The core of the governing damping magnet 16 is of laminated soft iron. This core is wound with a coil 19 serially included in one of the mains of the system so as to be subject to the current of the system. The core of this magnet is also wound with a coil 20 which is included in bridge between the mains of the system so as to be subject to the pressure of the system. The two coils are wound so as to tend to produce opposing fluxes. While the meter is operating below its overload range, the flux due to the current coil 19 is not materially effective because of the saturated condition of core 16 so that the flux due to the pressure coil 20 will cooperate with the flux due to the damping magnet 15 to cause the meter to operate proportionately to the energy consumed below the overload range.

When the meter is subject to overload, the magneto motive force due to the current coil 19 will rise and increase as the load increases to reduce the effective flux of the governing damping magnet to permit the meter to operate proportionately to the energy consumed. In order to prevent the governing or supplemental damping magnet from slowing the meter down too much on loads less than full load, I so proportion the core of this magnet that the core is substantially saturated due to the flux set up by a substantially constant magneto motive force, which is constantly set up by the pressure winding 20 when this coil 20 is most effective in producing damping flux, a condition obtaining on the lighter loads, the current winding 19 mainly functioning on the higher or overloads.

While I have employed a pressure winding for establishing a magneto motive force in the governing or supplemental damping magnet to be opposed by a magneto motive force due to the current winding 19 of this magnet, the invention is not to be thus limited.

Changes may be made without departing from the invention.

Having thus described my invention, I claim:

1. An electricity meter including a rotating motor having current and pressure windings and employing a closed metallic conductor upon the rotating element of the motor and a damping magnet element in inductive relation to said closed conductor and inclusive of current and pressure energizing windings tending to produce opposing fluxes in said damping magnet element.

2. An electricity meter including a rotating motor having current and pressure windings and employing a closed metallic conductor upon the rotating element of the motor and a damping magnet element in inductive relation to said closed conductor and energized to establish damping flux and inclusive of a current winding establishing an opposing magneto motive force.

3. An electricity meter including a rotating motor having current and pressure windings and employing a closed metallic conductor upon the rotating element of the motor and a damping magnet element in inductive relation to said closed conductor and energized to establish damping flux with substantially constant magneto-motive force and inclusive of a current winding establishing an opposing magneto motive force.

4. An electricity meter including a rotating motor having current and pressure windings and employing a closed metallic conductor upon the rotating element of the motor and main and supplemental damping magnet elements in inductive relation to said closed conductor, the supplemental damping magnet element being inclusive of current and pressure energizing windings producing opposing magneto motive forces therein.

5. An electricity meter including a rotating motor having current and pressure windings and employing a closed metallic conductor upon the rotating element of the motor and main and supplemental damping magnet elements in inductive relation to said closed conductor, the supplemental damping magnet element being energized to establish damping flux and being inclusive of a current winding establishing an opposing magneto motive force.

6. An electricity meter including a rotating motor having current and pressure windings and employing a closed metallic conductor upon the rotating element of the motor and main and supplemental damping magnet elements in inductive relation to said closed conductor, the supplemental damping magnet element being energized to establish damping flux with substantially constant magneto-motive force and being inclusive of a current winding establishing an opposing magneto motive force.

7. An electricity meter including a rotating motor having current and pressure windings and employing a closed metallic conductor upon the rotating element of the motor and a damping magnet element in inductive relation to said closed conductor and inclusive of magnetizable core and current and pressure energizing windings producing opposing magneto motive forces in said core which is proportioned to be substantially saturated by the flux due to the pressure winding on normal loads.

8. An electricity meter including a rotating motor having current and pressure windings and employing a closed metallic conductor upon the rotating element of the motor and main and supplemental damping magnet elements in inductive relation to said closed conductor, the supplemental damping magnet element being inclusive of a magnetizable core and current and pressure energizing windings producing opposing magneto motive forces in said core which is proportioned to be substantially saturated by the flux due to the pressure winding on normal loads.

In witness whereof, I hereunto subscribe my name.

JESSE HARRIS.